(No Model.)
C. W. NICHOLSON.
GUANO DISTRIBUTER.
No. 348,686. Patented Sept. 7, 1886.
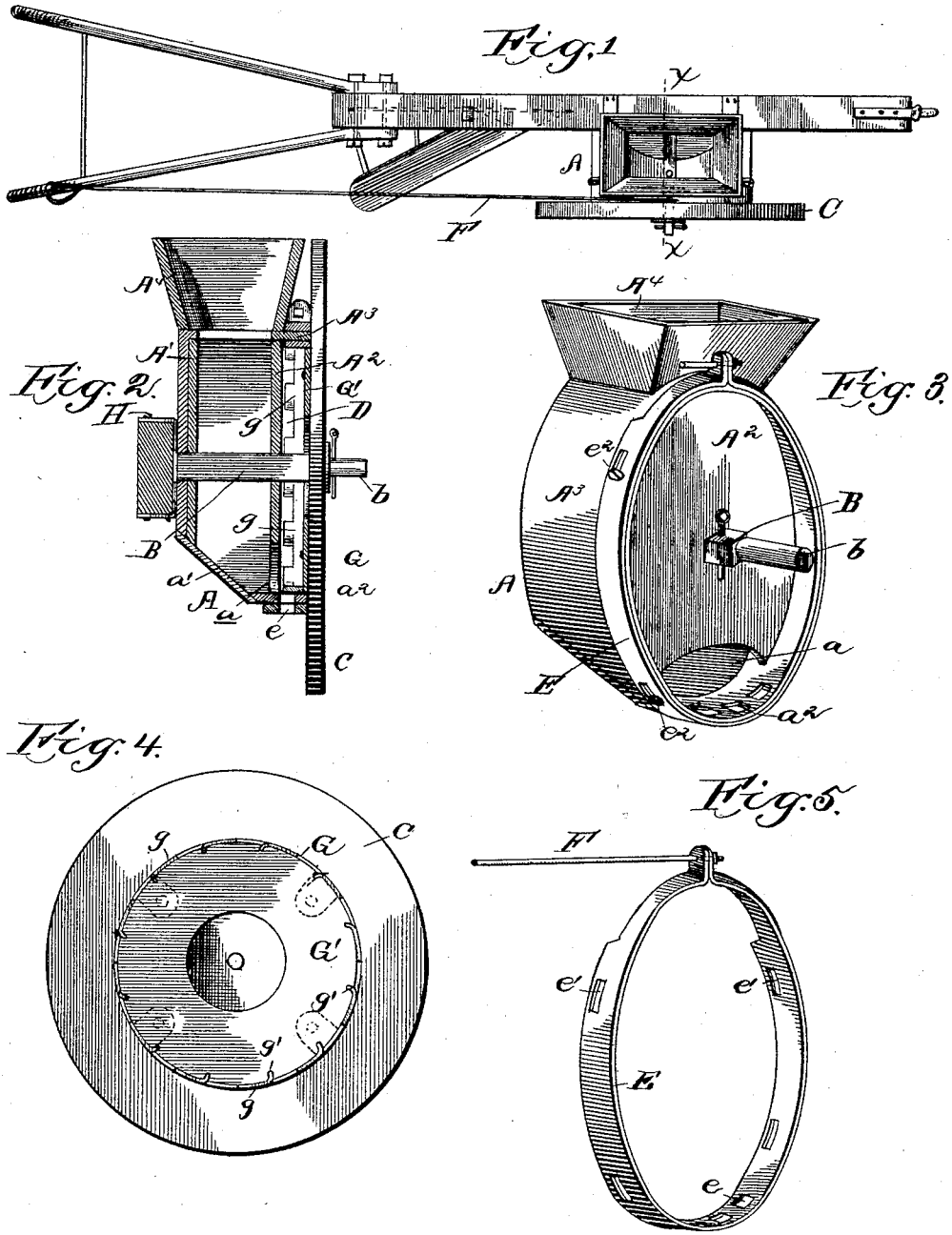
Witnesses
R. C. Laurie
G. P. Kramer
Inventor
Charles W. Nicholson
By R. S. & A. P. Lacey
Attys

UNITED STATES PATENT OFFICE.

CHARLES WESLEY NICHOLSON, OF ASSAMOOSICK, VIRGINIA.

GUANO-DISTRIBUTER.

SPECIFICATION forming part of Letters Patent No. 348,686, dated September 7, 1886.

Application filed July 2, 1886. Serial No. 206,957. (No model.)

*To all whom it may concern:*

Be it known that I, CHARLES WESLEY NICHOLSON, a citizen of the United States, residing at Assamoosick, in the county of Southampton and State of Virginia, have invented certain new and useful Improvements in Guano-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an attachment for distributing grain and fertilizer.

It has for its object to provide a simple and cheap device which may be readily applied to the beam of a plow, whereby seed and fertilizer may be distributed at the same time of plowing, and turned under.

The invention consists in the novel features more fully hereinafter set forth, claimed, and shown in the annexed drawings, in which—

Figure 1 is a plan view of a plow and my attachment in position. Fig. 2 is a section on the line X X of Fig. 1 on an enlarged scale. Fig. 3 is a perspective view of the device detached from the drive or supporting wheel. Fig. 4 is an inside view of the supporting-wheel, and Fig. 5 is a perspective view of the feed-regulating ring.

The hopper A is circular in form, and comprises the sides $A'$ $A^2$, the rim $A^3$, and the flaring mouth $A^4$. An arm or axle, B, extended through the center of the hopper, projects beyond the side $A^2$ and terminates in the spindle $b$, on which is mounted the drive or supporting wheel C. The rim $A^3$ projects beyond the side $A^2$ and forms a space or chamber, D, between it and the inner side of the wheel, which fits close against the edge of the rim. The lower portion of the side $A^2$ is cut away, forming an opening, $a$, which establishes communication between the hopper and chamber. That portion $a'$ of the side $A'$ opposite the opening is inclined inward, forming a chute to better direct the contents of the hopper through the opening. The lower portion of the rim projecting beyond the side $A^2$ is provided with a series of openings, $a^2$, through which the grain or fertilizer is discharged.

A band or ring, E, surrounding the projecting portion of the rim $A^3$, has openings $e$, corresponding with the openings $a^2$. It is provided with slots $e'$ at intervals, and screws or stops $e^2$, projecting from the rim $A^3$, and extending within the slots, to hold the bands in place and limit its movement. The proximate ends of the band are bent upward, and a rod, F, connected therewith, extends within convenient reach of the plowman, so he may regulate the discharge or cut it off, at will.

The inner face of the drive-wheel is provided with a rim, G, which is removably secured thereto. It fits snugly within the rim $A^3$, and is of a depth corresponding with the portion of the rim $A^3$ projecting beyond the side $A^2$. The edge is notched at intervals, forming projections $g$, which may lie in the plane of the rim, or have their forward ends, $g'$, bent inward toward the center, to present a more extended surface for pushing the grain or fertilizer toward the openings $a^2$. Said rim may be provided with ears for securing it to the wheel, as shown by dotted lines, Fig. 4; or it may be a flange formed by bending the edge of a plate or disk, $G'$.

The side A has clips H fastened thereto, by which the attachment may be secured to the plow-beam.

In practice the seed or fertilizer is supplied to the hopper through the mouth $A^4$, and is delivered into the lower portion of the compartment D through the opening $a$. The plow being set in motion, and the wheel resting upon the ground, the wheel is rotated, carrying the rim with it, the projections of which push the contents forward to the openings through which it is discharged. By regulating the position and number of the projections the feed may be varied, so that the grain or fertilizer may be dropped into check or in continuous row or drill. The feed may be cut off or the quantity varied by regulating the position of the band or ring E.

I am aware that a planter has been devised in which the drive-wheel forms a side of the hopper, and has a discharge-opening between the side of said wheel and the bottom of the hopper, said wheel being provided with pins adapted to work in the hopper and effect a discharge of its contents. No claim is made broadly to the above construction, inasmuch as by my construction a partition is interposed between the wheel and hopper, forming two compartments—one on each side—which are in communication. The one compartment holds the seed and is called the "hopper." The other is simply the discharge-compartment, and is formed between the hopper and side of the wheel.

Having thus described my invention, what I claim, and desire to secure by Letters Patent, is—

1. The combination, with the hopper having an axle-arm extending from the side thereof and a projecting rim, of a drive or supporting wheel mounted on the axle and forming a compartment between it and the side of the hopper, which compartment is in communication with the said hopper and has openings formed in the lower part, and projections extending from the side of the wheel and working in the compartment, substantially as and for the purpose described.

2. The combination of the hopper, an axle and rim projecting from a side thereof, a drive-wheel mounted on the axle and forming a compartment which is in communication with the hopper and has openings in the lower portion, a rim secured to the inner face of the wheel and notched at its edge, forming projections, substantially as and for the purposes described.

3. The combination of the hopper, a circular rim and axle extending from a side thereof, a drive-wheel mounted on the axle and forming a compartment which is in communication with the hopper and has openings in the lower portion, projections extending from the side of the wheel, and a band surrounding the circular rim and provided with openings corresponding with those in the compartment, said band being rotatable upon the rim, substantially as and for the purpose described.

4. The herein shown and described attachment for the purpose set forth, consisting of the sides $A'$ $A^2$, the rim $A^3$, projecting beyond the side $A^2$, and having openings in its lower portion, the axle, the drive-wheel, the notched rim G, the lower portion of the side $A^2$ being cut away and the portion $a'$ of the side $A'$ opposite said opening being inclined, and a band surrounding the projecting portion of the rim $A^3$, and provided with openings corresponding with the openings therein, and rotatable, substantially as and for the purpose described.

In testimony whereof I affix my signature in presence of two witnesses.

CHARLES WESLEY NICHOLSON.

Witnesses:
H. A. MOORE,
GEO. H. LEIGH.